(12) United States Patent
Shin et al.

(10) Patent No.: US 11,035,991 B2
(45) Date of Patent: Jun. 15, 2021

(54) POLARIZER, OPTICAL APPARATUS INCLUDING POLARIZER, DISPLAY APPARATUS INCLUDING POLARIZER, AND METHOD OF PREPARING POLARIZER

(71) Applicant: SAMSUNG DISPLAY CO., LTD., Yongin-si (KR)

(72) Inventors: Hyuneok Shin, Yongin-si (KR); Sanggab Kim, Yongin-si (KR); Gyungmin Baek, Yongin-si (KR); Dokeun Song, Yongin-si (KR); Sangwon Shin, Yongin-si (KR); Hyunmin Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 164 days.

(21) Appl. No.: 16/242,466

(22) Filed: Jan. 8, 2019

(65) Prior Publication Data
US 2019/0235147 A1    Aug. 1, 2019

(30) Foreign Application Priority Data
Jan. 31, 2018   (KR) .......................... 10-2018-0012026

(51) Int. Cl.
  *G02B 5/30*   (2006.01)
  *B29D 11/00*  (2006.01)
  *G02F 1/1335* (2006.01)

(52) U.S. Cl.
  CPC ...... *G02B 5/3058* (2013.01); *B29D 11/00644* (2013.01); *G02F 1/133536* (2013.01); *G02F 1/133548* (2021.01)

(58) Field of Classification Search
  CPC .. B29D 11/00644; B29D 11/00; G02B 5/003; G02B 5/0808; G02B 5/30; G02B 5/3058;
  (Continued)

(56) References Cited

U.S. PATENT DOCUMENTS

| 6,785,050 B2 * | 8/2004 | Lines .................... G02B 5/3058 359/352 |
| 7,233,563 B2 * | 6/2007 | Ueki ..................... G02B 5/3058 369/112.03 |

(Continued)

FOREIGN PATENT DOCUMENTS

| JP | 2009-186929 A | 8/2009 |
| JP | 2010-277077 A | 12/2010 |

(Continued)

OTHER PUBLICATIONS

The extended European search report for the corresponding European Patent Application No. 19153320.7 dated Jun. 12, 2019.
(Continued)

*Primary Examiner* — Balram T Parbadia
(74) *Attorney, Agent, or Firm* — Kile Park Reed & Houtteman PLLC

(57) ABSTRACT

A polarizer includes a substrate, and a plurality of stripe shaped grid lines on the substrate. Each of the grid lines may include a light absorbing layer and a reflective layer, the reflective layer being between the light absorbing layer and the substrate, and the light absorbing layer may include an oxide that contains molybdenum (Mo), tungsten (W), or a combination of Mo and W.

19 Claims, 6 Drawing Sheets

(58) Field of Classification Search
CPC ... G02F 1/133536; G02F 2001/133548; G02F 1/1335
See application file for complete search history.

(56) References Cited

U.S. PATENT DOCUMENTS

| | | | |
|---|---|---|---|
| 7,538,482 B2 | 5/2009 | Li et al. | |
| 7,570,424 B2* | 8/2009 | Perkins | G02B 5/3058 359/485.05 |
| 8,648,364 B2 | 2/2014 | Koo et al. | |
| 9,064,763 B2 | 6/2015 | Ozawa et al. | |
| 9,726,929 B2 | 8/2017 | Kawazu et al. | |
| 2008/0037094 A1* | 2/2008 | Hwang | G02B 5/3058 359/238 |
| 2008/0094547 A1* | 4/2008 | Sugita | G02F 1/133536 349/96 |
| 2008/0278811 A1* | 11/2008 | Perkins | G02B 5/3058 359/485.05 |
| 2008/0316599 A1* | 12/2008 | Wang | G02B 5/3058 359/485.05 |
| 2010/0302481 A1* | 12/2010 | Baum | B29D 11/00634 349/96 |
| 2011/0310328 A1* | 12/2011 | Kumai | G02B 5/3058 349/62 |
| 2011/0310329 A1* | 12/2011 | Kumai | G02F 1/133528 349/62 |
| 2012/0105745 A1 | 5/2012 | Kumai | |
| 2013/0120672 A1* | 5/2013 | Kumai | G02F 1/133528 349/5 |
| 2013/0242391 A1* | 9/2013 | Minemura | G02B 5/3058 359/485.01 |
| 2014/0009823 A1* | 1/2014 | Park | G02B 5/3075 359/352 |
| 2014/0021367 A1* | 1/2014 | Kim | G02B 27/283 250/453.11 |
| 2015/0362728 A1* | 12/2015 | Tei | G02B 5/3033 353/20 |
| 2016/0103262 A1* | 4/2016 | Kashiwagi | G02B 5/223 362/607 |
| 2016/0124133 A1 | 5/2016 | Han et al. | |
| 2016/0313599 A1* | 10/2016 | Kwon | G02F 1/133621 |
| 2017/0045658 A1* | 2/2017 | Kumai | G02B 1/10 |
| 2018/0074242 A1* | 3/2018 | Takahashi | B32B 27/308 |
| 2019/0109161 A1* | 4/2019 | Goto | G02B 1/11 |
| 2019/0265395 A1* | 8/2019 | Wheatley | G02B 5/136 |

FOREIGN PATENT DOCUMENTS

| | | |
|---|---|---|
| JP | 2012-027221 | 2/2012 |
| JP | 5682437 B2 | 3/2015 |
| KR | 10-0491143 B1 | 5/2005 |
| KR | 10-2016-0127279 A | 11/2016 |
| KR | 10-2017-0045773 A | 4/2017 |

OTHER PUBLICATIONS

X. J. Yu et al., "Optical wire-grid polarizers at oblique angles of incidence", Journal of Applied Physics, Apr. 15, 2003, pp. 4407-4412, vol. 93, No. 8, American Institute of Physics.

* cited by examiner

POLARIZER, OPTICAL APPARATUS INCLUDING POLARIZER, DISPLAY APPARATUS INCLUDING POLARIZER, AND METHOD OF PREPARING POLARIZER

CROSS-REFERENCE TO RELATED APPLICATION

Korean Patent Application No. 10-2018-0012026, filed on Jan. 31, 2018, in the Korean Intellectual Property Office, and entitled: "Polarizer, Optical Apparatus Including Polarizer, Display Apparatus Including Polarizer, and Method of Preparing Polarizer," is incorporated by reference herein in its entirety.

BACKGROUND

1. Field

Embodiments relate to a polarizer, an optical apparatus including the polarizer, a display apparatus including the polarizer, and a method of preparing the polarizer.

2. Description of the Related Art

Among various types of polarizers, a wire grid polarizer (WGP) includes a substrate (e.g., a transparent substrate) and grid lines (or grating lines) on the substrate. The grid lines of the WGP may be, for example, arranged such that the gaps between the grid lines are shorter than a wavelength of incident light. In light from a light source incident on a WGP, light in which an electric field vibrates in a direction parallel with the grid lines may be reflected by the WGP, whereas light in which an electric field vibrates in a direction perpendicular to the grid lines may pass through the WGP. Thus, a WGP may convert incident light from a light source into polarized light. A WGP may be used in various optical apparatuses that use polarized light, and also in various display apparatuses in which a display is implemented by using polarized light. As such, a WGP is applicable in various ways.

SUMMARY

Embodiments are directed to a polarizer, including a substrate, and a plurality of stripe shaped grid lines on the substrate. Each of the grid lines may include a light absorbing layer and a reflective layer, the reflective layer being between the light absorbing layer and the substrate, and the light absorbing layer may include an oxide that contains molybdenum (Mo), tungsten (W), or a combination of Mo and W.

The oxide may be $MoO_x$ or $WO_y$, wherein x and y are each a real number in a range of about 1 to about 5, and x may be other than 3.

The oxide may further include a second element other than Mo and W. The second element may satisfy a condition that a volatilization temperature of a halide of the second element is 100° C. or less.

The second element may be a Group IVB element, a Group VB element, a Group VIB element, a Group IVA element, or a combination thereof.

The second element may be a Group VB element.

The oxide may further include titanium (Ti), zirconium (Zr), vanadium (V), niobium (Nb), tantalum (Ta), dubnium (Db), tungsten (W), germanium (Ge), or a combination thereof.

A content of the second element in the metal oxide may be in a range of about 0.01 atomic percent (at %) to about 10 at %, based on 100 at % of a total amount of Mo, W, the second element, and oxygen (O) in the metal oxide.

The reflective layer may include aluminum (Al), silver (Ag), gold (Au), copper (Cu), platinum (Pt), chromium (Cr), molybdenum (Mo), tungsten (W), titanium (Ti), nickel (Ni), iron (Fe), or a combination thereof.

The reflective layer may include aluminum (Al), silver (Ag), or a combination thereof.

The reflective layer may further include nickel (Ni), titanium (Ti), or a combination thereof.

The reflective layer may include aluminum (Al) and nickel (Ni), and a content of the Ni may be in a range of about 0.01 at % to about 0.2 at %, based on 100 at % of the reflective layer.

The reflective layer may further include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), or a combination thereof.

A refractive-index control layer may be located on the light absorbing layer.

The refractive-index control layer may include a silicon oxide, a silicon nitride, or a silicon oxynitride.

Embodiments are also directed to an optical apparatus including a polarizer according to an embodiment.

Embodiments are also directed to a display apparatus including a backlight and a display. The display may be configured to convert light from the backlight into an image and may include a polarizer according to an embodiment.

The display may further include a quantum dot-containing color filter substrate.

Embodiments are also directed to a method of preparing a polarizer, the method including forming a reflective film on a substrate, forming a light absorbing film on the reflective film, the light absorbing film including an oxide that contains molybdenum (Mo), tungsten (W), or Mo and W, and patterning the reflective film and the light absorbing film to thereby form a plurality of stripe shaped grid lines on the substrate. Each of the grid lines may include a light absorbing layer and a reflective layer, the reflective layer being located between the light absorbing layer and the substrate, and the light absorbing layer may include the oxide.

The patterning of the reflective film and the light absorbing film may be performed by dry etching.

An etching gas used in the dry etching may be a halogen atom-containing gas.

BRIEF DESCRIPTION OF THE DRAWINGS

Features will become apparent to those of skill in the art by describing in detail example embodiments with reference to the attached drawings in which.

DETAILED DESCRIPTION

Figure 1:
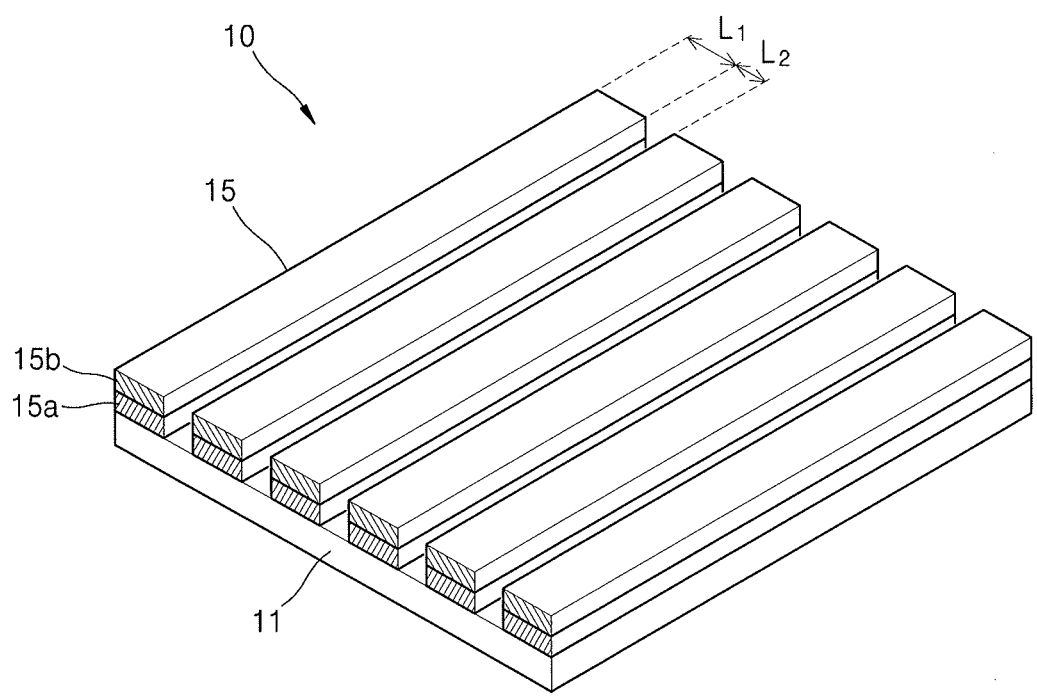
FIG. 1 illustrates a schematic view of a polarizer according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

FIG. 1 illustrates a schematic view of a polarizer 10 according to an example embodiment.

The polarizer 10 shown in FIG. 1 includes a substrate 11 and a plurality of stripe-type grid lines 15 on the substrate 11.

The substrate 11 may be a transparent substrate through which light may pass.

In an embodiment, the substrate 11 may be a glass (e.g., quartz glass or calcium fluoride glass), a sapphire, a resin (e.g., poly(methyl methacrylate) (PMMA), polyethylene terephthalate (PET), polycarbonate (PC), or polystyrene (PS)) substrate.

In an embodiment, a refractive index of the substrate 11 material may be, for example, in a range of about 1.4 to about 1.9.

The grid line 15 may include a light absorbing layer 15b and a reflective layer 15a disposed between the light absorbing layer 15b and the substrate 11.

The light absorbing layer 15b may absorb re-reflected light or light scattered by the polarizer 10, which may reduce or prevent light leakage from sides of the polarizer 10 and thus reduce or prevent deterioration of side contrast of the polarizer 10.

The light absorbing layer 15b may include, for example, an oxide containing a first element. The first element may be, for example, molybdenum (Mo), tungsten (W), or a combination thereof. The oxide containing the first element may have an excellent light absorption function, and substantially may not be reduced in the processes described further below where the polarizer 10 is exposed. Furthermore, the oxide containing the first element may reduce or avoid environmental pollution (whereas, for example, use of chromium oxide is restricted in various countries due to concerns for environmental pollution caused by chromium) and avoid being easily reduced after film formation (whereas, for example, copper oxide may be reduced).

In an embodiment, the oxide containing the first element may be $MoO_x$ or $WO_y$, wherein x and y are each a real number in a range of about 1 to about 5, and where x and y each indicate a ratio of atoms.

In an implementation, $MoO_x$ may be included where, in $MoO_x$, x is not 3 (i.e., $MoO_3$ is not included). $MoO_3$ has a relatively high solubility in water of 0.1066 grams per 100 milliliters (g/100 mL) (at a temperature of 18° C.) or 0.490 g/L (at a temperature of 28° C.). Thus, the oxides containing the first element other than $MoO_3$ may have erosion resistance against water and/or solvent (e.g., a developing solution such as tetramethyl ammonium hydroxide (TMAH) solution or KOH solution) that may be used in processes where the polarizer 10 is exposed (e.g., a development process accompanied with a patterning process) during or after the completion of the preparation of the polarizer 10. For example, the polarizer 10 may have excellent erosion resistance against an alkaline developing solution such as KOH solution.

In an embodiment, $MoO_x$ may be included where, in $MoO_x$, x is 2 (i.e., $MoO_2$ may be included).

In an embodiment, in $WO_y$, y may be 3.

The oxide containing the first element may further include a second element.

In an embodiment, the reflective layer 15a may include $MoO_2$ and the second element.

The second element may additionally provide the oxide containing the first element with erosion resistance against water and/or solvent (e.g., a developing solution such as tetramethyl ammonium hydroxide (TMAH) solution or KOH solution) that may be used in the following processes where the polarizer 10 is exposed (e.g., a development process accompanied with a patterning process) during or after the completion of the preparation of the polarizer 10. For example, the polarizer 10 may have excellent erosion resistance against an alkaline developing solution such as KOH solution.

The second element may be different from the first element.

Also, the second element may satisfy a condition in which a volatilization temperature of a halide of the second element (e.g., at least one of a fluoride of the second element and a chloride of the second element) is about 100° C. or less.

In an embodiment, the second element may satisfy a condition in which a volatilization temperature of a halide of the second element (e.g., at least one of a fluoride of the second element and a chloride of the second element) is: i) about −150° C. or higher and about 100° C. or lower, ii) about −100° C. or higher and about 100° C. or lower, or iii) about −100° C. or higher and about 70° C. or lower.

The expression "satisfies a condition in which a volatilization temperature of a halide of the second element is 'A'", as used herein, indicates that a volatilization temperature of at least one of a fluoride, a chloride, a bromide, and an iodide of the second element satisfies the condition 'A'. This expression does not mean that volatilization temperatures of all of a fluoride, a chloride, a bromide, and an iodide of the second element second element satisfy the condition 'A'.

When the second element satisfies a condition in which a volatilization temperature of a halide of the second element is about 100° C. or less, upon patterning the plurality of stripe-type grid lines 15, a halide of the second element (generated by the combination of a halogen atom-containing gas (which may be used as an etching gas) and the second element) may be easily volatilized even at a low temperature. Thus, micropatterning of the grid line 15 having a micro line-width may be facilitated.

Thus, when the oxide containing the first element of the light absorbing layer 15b further includes the second element described above, the polarizer 10 may have erosion resistance against water and/or solvent that may be used in the following processes, and may exhibit excellent processability of the grid line 15 by effective micropatterning, simultaneously.

In an embodiment, the second element may be a Group IVB element, a Group VB element, a Group VIB element, a Group IVA element, or a combination thereof.

In an embodiment, the second element may be a Group VB element.

In an embodiment, the second element may be titanium (Ti), zirconium (Zr), vanadium (V), niobium (Nb), tantalum (Ta), dubnium (Db), tungsten (W), germanium (Ge), or a combination thereof.

Table 1 shows the volatilization temperatures of fluorides and chlorides of each of Ti, Zr, V, Nb, Db, Ta, W, and Ge. Table 1 confirms that a volatilization temperature of at least one of fluorides and chlorides of Ti, Zr, V, Nb, Db, Ta, W, and Ge is about 100° C. or less.

TABLE 1

| Element | Volatilization temperature of a fluoride of the element (° C.) measured at 1 atm | Volatilization temperature of a chloride of the element (° C.) measured at 1 atm |
|---|---|---|
| Ta | −23 (TaF$_5$) | 14.5 (TaCl$_5$) |
| V | −100 (VF$_5$) | 10 (VCl$_4$) |
| Nb | 66.5 (NbF$_5$) | 14.6 (NbCl$_5$) |
| Ti | 45 (TiF$_4$) | −95 (TiCl$_4$) |
| W | −100 (WF$_6$) | 66.2 (WCl$_6$) |
| Zr | 455 (ZrF$_4$) | 69 (ZrCl$_4$) |
| Ge | −100 (GeF$_4$) | −100 (GeCl$_4$) |

In an embodiment, a content of the second element may be in a range of about 0.01 atomic percent (at %) to about 10 atomic percent (at %), about 0.1 at % to about 10 at %, or about 1 at % to about 10 at %, based on 100 atomic percent (at %) of the total content of the first element, the second element and oxygen (O). When the content of the second element is within these ranges, the light absorbing layer 15b may have excellent light absorbing properties and erosion resistance, simultaneously.

In an embodiment, the oxide containing the first element and the second element may be an oxide represented by Formula 1 or Formula 2:

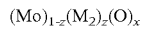

$$(Mo)_{1-z}(M_2)_z(O)_x \quad \text{Formula 1}$$

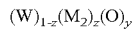

$$(W)_{1-z}(M_2)_z(O)_y \quad \text{Formula 2}$$

wherein, in Formulae 1 and 2,

Mo is molybdenum,

W is tungsten,

O is oxygen,

M$_2$ may be a Group IVB element, a Group VB element, a Group VIB element, a Group IVA element, or a combination thereof, x and y may each be a real number in a range of about 1 to about 5, provided that x is not 3, z may be in a range of about 0.01% to about 10%, about 0.1% to about 10% or about 1% to about 10% of 1+x and 1+y, and x, y, and z may each indicate an atomic ratio.

In Formula 1, x may not be 3. For example, x in Formula 1 may be 2.

y in Formula 2 may be 3.

M$_2$ may be understood by referring to the descriptions for the second element as described herein.

The thickness of the light absorbing layer 15b may be in a range of about 10 nanometers (nm) to about 300 nm, for example, about 10 nm to about 100 nm, or for example, about 30 nm to about 50 nm. When the thickness of the light absorbing layer 15b is within any of these ranges, the polarized light generating ability of the reflective layer 15a may not be deteriorated, and also, it may be possible to realize the grid line 15 having excellent light absorbing characteristics.

The light absorbing effects of the light absorbing layer 15b as described above may be confirmed by Table 2.

TABLE 2

| Light absorbing film Thickness (Angstrom, Å) | Average reflectance (%) | Reflectance for light having a wavelength of 550 nm (%) |
|---|---|---|
| 0 | 100 | 100 |
| 400 | 11.2 | 0.1 |
| 450 | 9.7 | 1.5 |
| 500 | 10.9 | 5.5 |

MoO$_2$ and tantalum (Ta) were co-deposited on an aluminum film (370 millimeters (mm)×470 mm) having a thickness of 2,500 Å to form a light absorbing film having thicknesses as shown in Table 2. Then, the average reflectance for visible light and reflectance for light having a wavelength of 550 nm were measured by using a spectrometer, thereby obtaining the reflectance data shown in Table 2. Here, the content of Ta in the light absorbing film was 6 at %, based on 100 at % of the total content of MoO$_2$ and Ta.

In view of Table 2, it was confirmed that the reduction of light reflectance by the light absorbing film containing MoO$_2$ and Ta was significant.

In the grid line 15, the reflective layer 15a is disposed between the light absorbing layer 15b and the substrate 11. In light incident on the polarizer 10, light in which an electric field vibrates in a direction parallel with the grid line 15 may be reflected by the reflective layer 15a, whereas light in which an electric field vibrates in a direction perpendicular to the grid line 15 may pass through the reflective layer 15a. Thus, the reflective layer 15a may convert light incident on the polarizer 10 into polarized light.

The reflective layer 15a may include a material that reflects light (e.g., a metal or an alloy).

In an embodiment, the reflective layer may include, for example, aluminum (Al), silver (Ag), gold (Au), copper (Cu), platinum (Pt), chromium (Cr), molybdenum (Mo), tungsten (W), titanium (Ti), nickel (Ni), iron (Fe), or a combination thereof.

In an embodiment, the reflective layer 15a may include Al, Ag, or a combination thereof. For example, the reflective layer 15a may include Al. Al has excellent light reflection characteristics, and is substantially hillock-free at a high temperature. When the reflective layer 15a includes Al, the content of Al may be in a range of about 99 at % to about 100 at %, based on 100 at % of the reflective layer 15a.

In an embodiment, the reflective layer 15a may further include, in addition to Al, Ag, or a combination thereof, Ni, Ti, or a combination thereof. Ni and/or Ti may improve reflectance of the reflective layer 15a and chemical resistance.

In an embodiment, the reflective layer 15a may include Al and Ni. Here, the content of Ni may be in a range of about 0.01 at % to 0.2 at %, 0.01 at % to 0.1 at %, or 0.02 at % to 0.1 at %, based on 100 at % of the reflective layer 15a.

In an embodiment, the reflective layer 15a may include a first reflective layer and a second reflective layer between the first reflective layer and the light absorbing layer 15b. For example, the first reflective layer may include Al, and the second reflective layer may include Ti. The first reflective layer may further include, in addition to Al, at least one of Ni and Ti.

In an embodiment, the reflective layer 15a may include aluminum (Al), silver (Ag), gold (Au), copper (Cu), platinum (Pt), chromium (Cr), molybdenum (Mo), tungsten (W), titanium (Ti), nickel (Ni), iron (Fe), or a combination thereof, and a third element, wherein the third element may be lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), or a combination thereof. The third element may improve thermal stability of the reflective layer 15a and suppress galvanic corrosion.

The content of the third element may be in a range of about 0.01 at % to about 0.2 at % or about 0.02 at % to about 0.1 at %, based on 100 at % of the reflective layer 15a.

For example, the third element may be La or Nd.

In an embodiment, the reflective layer 15a may include Al, Ni, and La, wherein the content of Ni may be in a range of about 0.01 at % to about 0.1 at %, based on 100 at % of the reflective layer 15a, and the content of La may be in a range of about 0.02 at % to about 0.1 at %, based on 100 at % of the reflective layer 15a. In some embodiments, the total content of Ni and La may be greater than about 0 at % and less than about 0.1 at %, based on 100 at % of the reflective layer 15a.

In an embodiment, the reflective layer 15a may include Al and Nd, wherein the content of Nd may be in a range of about 0.02 at % to about 0.1 at %, based on 100 at % of the reflective layer 15a.

A width $L_1$ of the grid line 15 may be in a range of about 20 nm to about 1,000 nm, for example, about 20 nm to about 50 nm, A slit width $L_2$ between any two adjacent grid lines 15 may be in a range of about 20 nm to about 1,000 nm, for example, about 20 nm to about 50 nm. When the width $L_1$ and the slit width $L_2$ are within these ranges, effective generation of polarized light may be possible.

Table 5 shows the polarization degree, reflectance, and transmittance of each of Polarizers 1, 2, and 3, of which the structure of the grid lines 15 are shown in Table 3 and the grid line 15 patterns are as shown in Table 4.

TABLE 3

| | Structure of grid lines 15 |
|---|---|
| Polarizer 1 (Comparative Example) | AlNiLa reflective layer (250 nm) Ni content: 0.02 at % and La content: 0.04 at %, based on 100 at % of AlNiLa |
| Polarizer 2 (Comparative Example) | Al first reflective layer (250 nm)/Ti second reflective layer (15 nm) |
| Polarizer 3 (Example) | AlNiLa reflective layer (250 nm)/MoO$_2$ + Ta light absorbing layer (15 nm) 1) Ni content: 0.02 at % and La content: 0.04 at %, based on 100 at % of AlNiLa 2) Ta content in MoO$_2$ + Ta light absorbing layer: 6 at %, based on 100 at % of the total content of MoO$_2$ and Ta |

TABLE 4

| Substrate | Glass substrate (37 cm × 47 cm) having a thickness of 500 micrometers (μm) |
|---|---|
| The width $L_1$ of the grid line 15 | 50 nm |
| The slit width $L_2$ between two adjacent grid lines 15 | 50 nm |
| The height of the grid line 15 | 280 nm |
| The patterning method of the grid line 15 | Dry etching |
| Etching gas | SF$_6$ |

TABLE 5

| | Polarization degree (%) | Reflectance for light having a wavelength of 550 nm (%) | Transmittance for light having a wavelength of 550 nm (%) |
|---|---|---|---|
| Polarizer 1 (Comparative Example) | 99.999 | 45.8 | 40.3 |
| Polarizer 2 (Comparative Example) | 99.999 | 31.8 | 38.1 |
| Polarizer 3 (Example) | 99.999 | 10.3 | 37 |

As it may be seen from Table 5, it was confirmed that Polarizer 3 had a significantly lower reflectance (about 1/3), as compared with Polarizers 1 and 2, without a decrease in polarization degree and transmittance. As such, it is expected that the side contrast of Polarizer 3 may be about 300% greater than those of Polarizers 1 and 2. Here, a polarization degree measurer available from Prometric Inc. was used in the measurement of the polarization degree.

Figure 2:
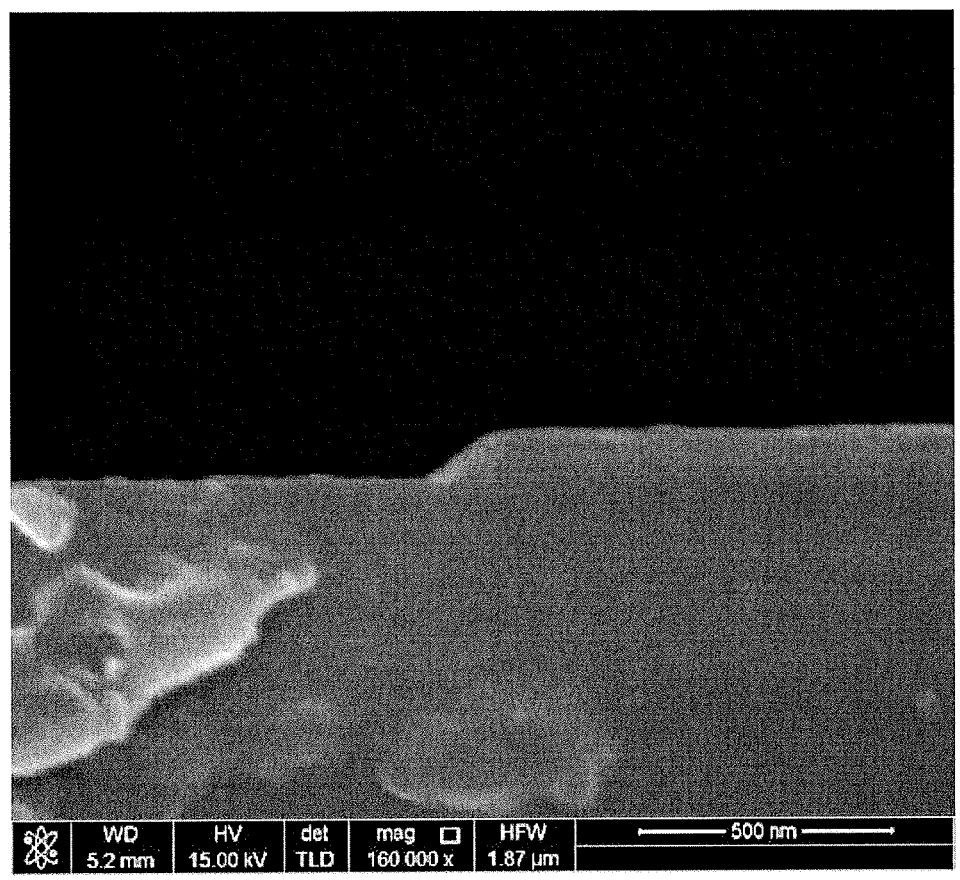
FIG. 2 illustrates a scanning electron microscope (SEM) image of a cross-section of Light Absorbing Film 1 after an aqueous stripper treatment.
Figure 3:
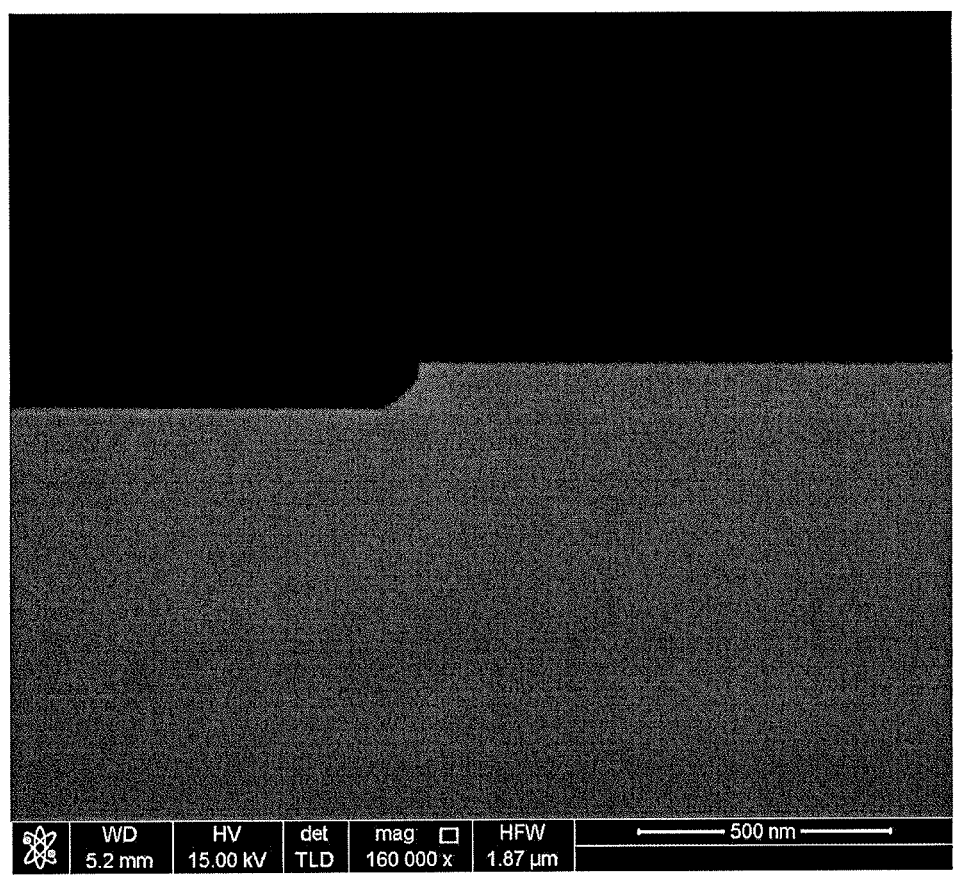
FIG. 3 illustrates an SEM image of a cross-section of Light Absorbing Film 1 after a TMAH developing solution (2.38 weight percent (wt %) aqueous solution) treatment.
Figure 4:
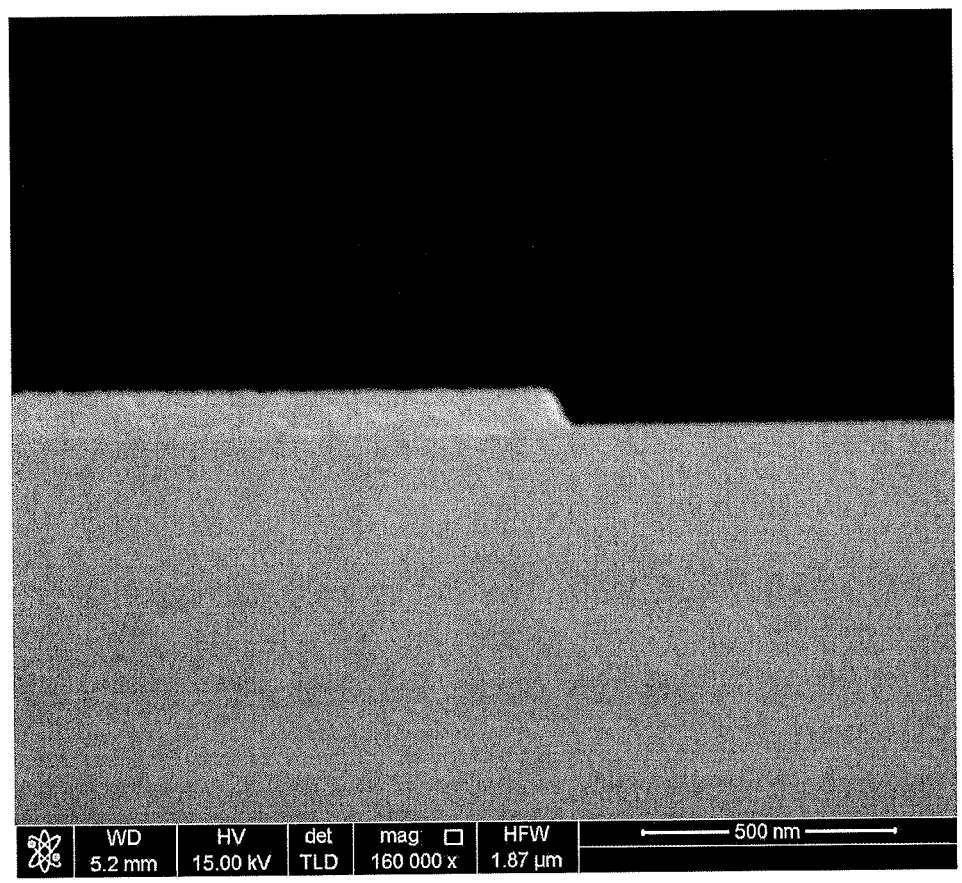
FIG. 4 illustrates an SEM image of a cross-section of Light Absorbing Film 1 after a KOH developing solution (0.043 wt % aqueous solution) treatment.

Table 8 and FIGS. 2, 3, and 4 show the erosion resistance data of Light Absorbing Films 1 and/or 2. First, according to Table 6, MoO$_2$ and Ta were co-deposited on a glass substrate to form a MoO$_2$+Ta light absorbing layer. Subsequently, according to Table 7, a stripe-type pattern was formed on each of the MoO$_2$+Ta light absorbing layer to prepare Light Absorbing Films 1 and 2.

TABLE 6

| Light Absorbing Film 1 | Glass substrate (500 μm)/MoO$_2$ + Ta light absorbing layer (200 nm) Ta content in MoO$_2$ + Ta light absorbing layer: 6 at %, based on 100 at % of the total content of MoO$_2$ and Ta |
|---|---|
| Light Absorbing Film 2 | Glass substrate (500 μm)/MoO$_2$ + Ta light absorbing layer (200 nm) Ta content in MoO$_2$ + Ta light absorbing layer: 2 at %, based on 100 at % of the total content of MoO$_2$ and Ta |

TABLE 7

| Stripe-type pattern width | 700 nm |
|---|---|
| Slit width between two stripe-type patterns | 700 nm |
| Stripe-type pattern height | 90 nm |
| Patterning method of stripe-type pattern | Dry etching |
| Etching gas | SF$_6$ |

To evaluate erosion resistance, each of four Light Absorbing Films 1 underwent chemical treatment by dipping at room temperature (25° C.) for 10 minutes in an aqueous stripper (LT-360T available from Ltc Co., Ltd.), an organic stripper (LCS-1000 available from ENF), a TMAH developing solution (2.38 wt % aqueous solution), and a KOH aqueous solution (0.043 wt % aqueous solution), respectively. This chemical treatment was also performed on four Light Absorbing Films 2. Subsequently, Light Absorbing Films 1 and 2 were dried. Then, the cross-sections of Light Absorbing Films 1 and 2 were observed by using scanning electron microscope (SEM) to thereby measure the thickness of each of the light absorbing layer and the amount of change in thickness of the light absorbing layer, which are shown in Table 8. In Table 8, the amount of change in thickness of the light absorbing layer was calculated by subtracting a thickness of the light absorbing layer after the chemical treatment from a thickness of the light absorbing layer before the chemical treatment. Cross-sections of Light Absorbing Films 1 observed by using SEM after the aqueous stripper treatment, the TMAH developing solution (2.38 wt % aqueous solution) treatment, and the KOH developing solution (0.043 wt % aqueous solution) treatment are respectively shown in FIGS. 2, 3, and 4.

TABLE 8

|  | Aqueous stripper treatment | Organic stripper treatment | TMAH developing solution treatment | KOH developing solution treatment |
|---|---|---|---|---|
| Rate of change in thickness (nm) of light absorbing layer of Light Absorbing Film 1 (Ta content: 6 at %) | 0 | 0 | 0 | 0 |
| Rate of change in thickness (nm) of light absorbing layer of Light Absorbing Film 2 (Ta content: 2 at %) | 0 | 0 | 0 | 0 |

As it may be seen from Table 8 and FIGS. 2, 3, and 4, it was confirmed that the light absorbing layers of Light Absorbing Films 1 and 2 have excellent erosion resistance against various chemical treatments to which a polarizer may be exposed after the completion of the manufacture of the polarizer.

Figure 5:
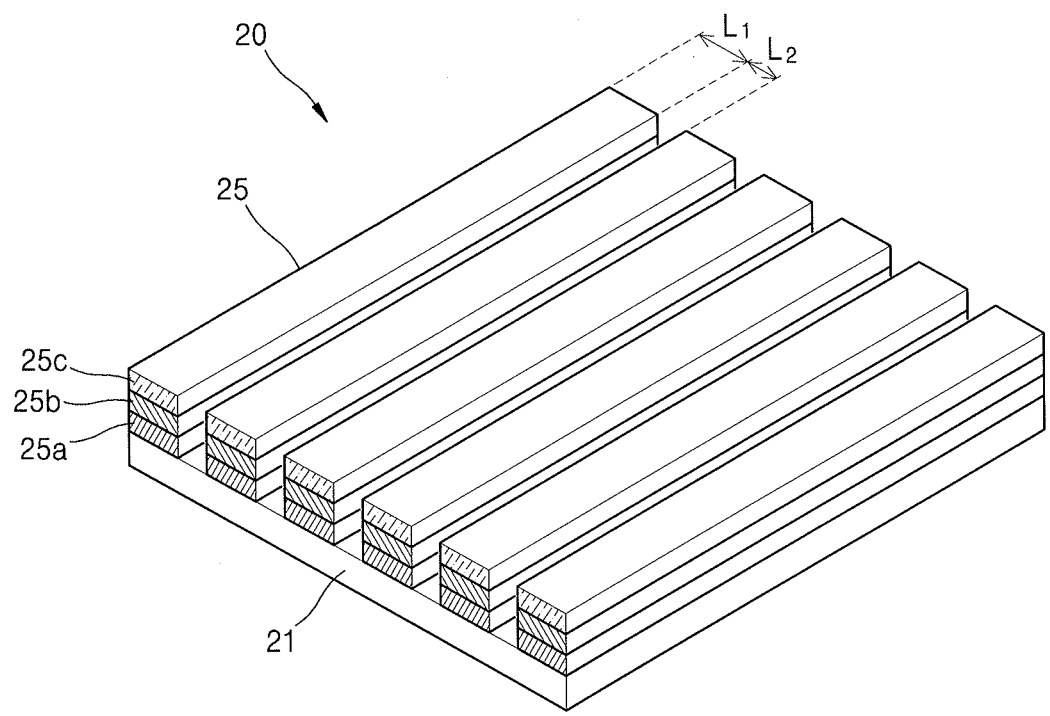
FIG. 5 illustrates a schematic view of a polarizer according to another example embodiment.

FIG. 5 illustrates a schematic view of a polarizer according to another example embodiment.

As shown in FIG. 5, a polarizer 20 according to an example embodiment may include a substrate 21 and a plurality of stripe-type grid lines 25 on the substrate 21, wherein each of the plurality of stripe-type grid lines 25 includes a light absorbing layer 25b, a reflective layer 25a disposed between the light absorbing layer 25b and the substrate 21, and a refractive-index control layer 25c on the light absorbing layer 25b.

Descriptions for the substrate 21, the grid line 25, the light absorbing layer 25b, the reflective layer 25a, the width $L_1$ of the grid line 25, and the slit width $L_2$ between any two adjacent grid lines 25 in FIG. 5 may be understood by referring to the descriptions set forth above for the substrate 11, the grid line 15, the light absorbing layer 15b, the reflective layer 15a, the width $L_1$ of the grid line 15, and the slit width $L_2$ between any two adjacent grid lines 15 in FIG. 1, respectively.

The refractive-index control layer 25c may further prevent generation of re-reflected light and/or scattered light by the polarizer 20, and may thus help to prevent light leakage from sides of the polarizer 20.

The refractive-index control layer 25c may include, for example, silicon (Si) oxide, silicon nitride, or silicon oxynitride.

Optical Apparatus

The polarizer as described above may be applicable to various optical apparatuses. Thus, according to another example embodiment, an optical apparatus including the polarizer may be provided.

The optical apparatus may be, for example, a photoelectric conversion device, an optical module, a lighting device, an exposure device, a pulse generating device, a display apparatus, a spectroscope, a fluoroscope, etc.

Display Apparatus

The polarizer as described above may be applicable to various display apparatuses.

For example, a display apparatus may include a backlight unit and a display unit, wherein the display unit converts light from the backlight unit into an image, and may include the polarizer.

Figure 6:
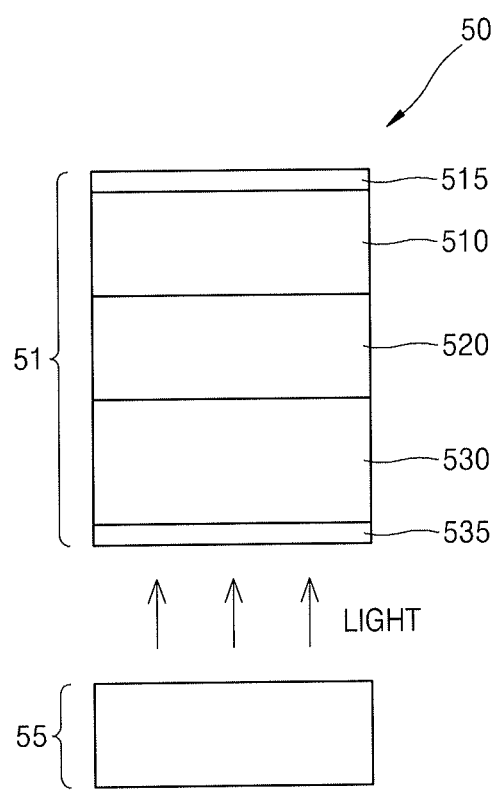
FIG. 6 illustrates a schematic view of a display apparatus according to an example embodiment.

FIG. 6 illustrates a schematic cross-sectional view of a display apparatus 50 according to an example embodiment.

The display apparatus 50 may include a backlight 55 and a display 51. The light source 55 may include a light generator (e.g., a lamp, an inorganic light-emitting device, an organic light-emitting device, etc.). In addition to a light generator, the light source 55 may include, for example, a polarization film, a diffuser plate, a light guide plate, a reflecting plate, or a combination thereof.

The display 51 may convert light from the backlight 55 into an image.

The display 51 may include a color filter substrate 510, a thin film transistor (TFT) substrate 530, and a liquid crystal layer 520 disposed between the color filter substrate 510 and the TFT substrate 530.

The color filter substrate 510 may include a color filter and an electrode (e.g., a transparent electrode) for realizing a full-color image realization. The color filter may include a quantum dot.

The TFT substrate 530 may include various TFTs and an electrode (e.g., a reflective electrode).

The display 51 may include a first polarizer 515 coupled to the color filter substrate 510, and a second polarizer 535 coupled to the TFT substrate 530. At least one of the first polarizer 515 and the second polarizer 535 may be a polarizer according to an embodiment described herein.

The display apparatus 50 in FIG. 6 includes the first polarizer 515 and the second polarizer 535 on outer sides of the color filter substrate 510 and the TFT substrate 530, respectively; however, the position of the color filter substrate 510 and that of the first polarizer 515 may be changed with each other, and the position of the TFT substrate 530 and that of the second polarizer 535 may be changed with each other, i.e., one or both of structures 510 and 530 may be inverted. As such, various modifications are possible.

Method of Preparing Polarizer

A method of preparing the polarizer may include:
forming a reflective film on a substrate;
forming a light absorbing film on the reflective film, wherein the light absorbing film may include an oxide containing a first element, wherein the first element may be molybdenum (Mo), tungsten (W), or a combination thereof; and
patterning the reflective film and the light absorbing film to form a plurality of stripe-type grid lines on the substrate.

Accordingly, the grid line may include a light absorbing layer and a reflective layer between the light absorbing layer and the substrate, wherein the light absorbing layer may include an oxide containing a first element, wherein the first element may be Mo, W, or a combination thereof.

In an implementation, the reflective film and the light absorbing film may not be patterned. The reflective film and the light absorbing film may be formed respectively using materials for the reflective layer 15a and 25a and the light absorbing layer 15b and 25b by using a suitable method (e.g., deposition, laser-induced thermal imaging (LITI), or the like). The substrate, on which the reflective film and the light absorbing film are sequentially formed, may be understood by referring to the descriptions for the substrate 11 and 21 in FIGS. 1 and 5, respectively.

The grid line. the light absorbing layer, and the reflective layer formed according to the method of preparing the polarizer may each be understood by referring to the descriptions for the grid line 15 and 25, the light absorbing layer 15b and 25b, and the reflective layer 15a and 25a in FIGS. 1 and 5, respectively.

In an embodiment, in the method of preparing the polarizer, the patterning of the reflective film and the light absorbing film may be performed by dry etching. Here, an etching gas used, in the dry etching may be a halogen element-containing gas. Examples of the halogen element include fluorine (F), chlorine (Cl), bromine (Br), and iodine (I).

For example, the etching gas may be a F-containing gas. For example, the etching gas may be fluorine ($F_2$), tetrafluoromethane ($CF_4$), sulfur hexafluoride ($SF_6$), nitrogen trifluoride ($NF_3$), or trifluoromethane ($CHF_3$).

For example, the etching gas may be a Cl-containing gas. For example, the etching gas may be chlorine ($Cl_2$), boron trichloride ($BCl_3$), silicon tetrachloride ($SiCl_4$), or carbon tetrachloride ($CCl_4$).

For example, the etching gas may be a Br-containing gas. For example, the etching gas may be hydrogen bromide (HBr).

When the light absorbing layer 15b and 25b of the polarizer further includes a second element and the second element satisfies a condition in which a volatilization temperature of a halide of the second element is about 100° C. or less, upon micropatterning of the grid line 15 and 25 by dry etching using a halogen atom-containing gas as an etching gas, the halide of the second element formed by contact with the halogen atom-containing gas may be easily volatilized. Thus. patterning of the grid line 15 and 25 having a micro line-width may be facilitated.

As described above, embodiments may provide a WGP or grid line polarizer, an optical apparatus including the polarizer, a display apparatus including the polarizer, and a method of preparing the polarizer, wherein the grid line polarizer may have an excellent polarized light-conversion capability and an excellent reflected light-rescattering prevention capability. The polarizer may have erosion resistance during fabrication processes as well as an excellent polarized light-conversion capability and an excellent reflected light-rescattering prevention capability. Thus, the polarizer may be effectively applicable to micropatterning processes as well. Therefore, a high quality optical product and display may be realized by using an optical apparatus and a display apparatus including the polarizer.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polarizer, comprising:
   a substrate; and
   a plurality of stripe shaped grid lines on the substrate, wherein:
   each of the grid lines includes a light absorbing layer and a reflective layer, the reflective layer being between the light absorbing layer and the substrate,
   the light absorbing layer includes an oxide that contains a first element,
   the oxide containing the first element is $MoO_x$, $WO_y$, or a combination thereof, and
   x and y are each a real number in a range of about 1 to about 5, provided that x is not 3.

2. The polarizer as claimed in claim 1, wherein the oxide containing the first element further includes a second element other than Mo and W, wherein the second element satisfies a condition that a volatilization temperature of a halide of the second element is 100° C. or less.

3. The polarizer as claimed in claim 2, wherein the second element is a Group IVB element, a Group VB element, a Group VIB element, a Group IVA element, or a combination thereof.

4. The polarizer as claimed in claim 2, wherein the second element is a Group VB element.

5. The polarizer as claimed in claim 2, wherein a content of the second element in the metal oxide is in a range of about 0.01 atomic percent (at %) to about 10 at %, based on 100 at % of a total amount of Mo, W, the second element, and oxygen (O) in the metal oxide.

6. The polarizer as claimed in claim 1, wherein the oxide containing the first element further includes titanium (Ti), zirconium (Zr), vanadium (V), niobium (Nb), tantalum (Ta), dubnium (Db), germanium (Ge), or a combination thereof.

7. The polarizer as claimed in claim 1, wherein the reflective layer includes aluminum (Al), silver (Ag), gold (Au), copper (Cu), platinum (Pt), chromium (Cr), molybdenum (Mo), tungsten (W), titanium (Ti), nickel (Ni), iron (Fe), or a combination thereof.

8. The polarizer as claimed in claim 7, wherein the reflective layer further includes lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), or a combination thereof.

9. The polarizer as claimed in claim 1, wherein the reflective layer includes aluminum (Al), silver (Ag), or a combination thereof.

10. The polarizer as claimed in claim 9, wherein the reflective layer further includes nickel (Ni), titanium (Ti), or a combination thereof.

11. The polarizer as claimed in claim 1, wherein the reflective layer includes aluminum (Al) and nickel (Ni), and a content of the Ni is in a range of about 0.01 at % to about 0.2 at %, based on 100 at % of the reflective layer.

12. The polarizer as claimed in claim 1, wherein a refractive-index control layer is located on the light absorbing layer.

13. The polarizer as claimed in claim 12, wherein the refractive-index control layer includes a silicon oxide, a silicon nitride, or a silicon oxynitride.

14. An optical apparatus comprising the polarizer as claimed in claim 1.

15. A display apparatus comprising a backlight and a display, wherein the display is configured to convert light from the backlight into an image and includes the polarizer as claimed in claim 1.

16. The display apparatus as claimed in claim 15, wherein the display further includes a quantum dot-containing color filter substrate.

17. A method of preparing a polarizer, the method comprising:
   forming a reflective film on a substrate;

forming a light absorbing film on the reflective film, the light absorbing film including an oxide that contains a first element; and patterning the reflective film and the light absorbing film to thereby form a plurality of stripe shaped grid lines on the substrate, wherein:

each of the grid lines includes a light absorbing layer and a reflective layer, the reflective layer being located between the light absorbing layer and the substrate, the light absorbing layer includes the oxide containing the first element, the oxide containing the first element is $MoO_x$, $WO_y$, or a combination thereof, and x and y are each a real number in a range of about 1 to about 5, provided that x is not 3.

18. The method as claimed in claim 17, wherein the patterning of the reflective film and the light absorbing film is performed by dry etching.

19. The method as claimed in claim 18, wherein an etching gas used in the dry etching is a halogen atom-containing gas.

* * * * *